(12) United States Patent
Fan et al.

(10) Patent No.: US 9,483,336 B2
(45) Date of Patent: Nov. 1, 2016

(54) METHOD FOR CORRECTING MEMORY ERROR OF APPLICATION PROGRAM

(71) Applicant: Huawei Technologies Co., Ltd., Shenzhen, Guangdong (CN)

(72) Inventors: Wenlin Fan, Shenzhen (CN); Jiang Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 14/143,881

(22) Filed: Dec. 30, 2013

(65) Prior Publication Data

US 2014/0115389 A1   Apr. 24, 2014

Related U.S. Application Data

(63) Continuation of application No. PCT/CN2011/077640, filed on Jul. 26, 2011.

(51) Int. Cl.
*G06F 11/00* (2006.01)
*G06F 11/07* (2006.01)

(52) U.S. Cl.
CPC .......... *G06F 11/073* (2013.01); *G06F 11/0715* (2013.01); *G06F 11/0793* (2013.01)

(58) Field of Classification Search
CPC . G06F 11/073; G06F 11/0793; G06F 11/302
See application file for complete search history.

(56) References Cited

U.S. PATENT DOCUMENTS

| 7,089,455 | B2 * | 8/2006 | Ruhlen | G06F 9/4843 714/38.14 |
| 2002/0062459 | A1 * | 5/2002 | Lasserre | G06F 1/206 714/10 |
| 2003/0018681 | A1 * | 1/2003 | Subramanian | G06F 9/3861 718/102 |
| 2003/0225960 | A1 | 12/2003 | Guu et al. | |
| 2006/0020858 | A1 * | 1/2006 | Schaefer | G06F 11/0715 714/38.1 |
| 2006/0075274 | A1 * | 4/2006 | Zimmer | G06F 11/0793 714/2 |
| 2009/0183025 | A1 | 7/2009 | Palazzolo et al. | |
| 2010/0313069 | A1 * | 12/2010 | Murata | G06F 11/0727 714/15 |

FOREIGN PATENT DOCUMENTS

| CN | 1461999 A | 12/2003 |
| CN | 1470985 A | 1/2004 |
| CN | 101023411 A | 8/2007 |
| CN | 101833497 A | 9/2010 |

* cited by examiner

*Primary Examiner* — Philip Guyton

(57) ABSTRACT

A method for correcting a memory error of an application program are provided, which includes: when an error occurs in a memory occupied by an application program, suspending a process of the application program; waking up an error correction program that corresponds to the application program, where the error correction program is created when the application program is started; performing, by the error correction program, correction processing on the memory in which the error occurs; if the correction processing performed on the memory in which the error occurs fails, closing, by the error correction program, the application program after saving key data of the application program; and if the correction processing performed on the memory in which the error occurs succeeds, restoring, by the error correction program, the process of the application program that is suspended. Thus reliability and security can be improved when the application program is applied.

18 Claims, 6 Drawing Sheets

METHOD FOR CORRECTING MEMORY ERROR OF APPLICATION PROGRAM

CROSS-REFERENCE TO RELATED APPLICATIONS

This application is a continuation of International Application No. PCT/CN2011/077640, filed on Jul. 26, 2011, which is hereby incorporated by reference in its entirety.

TECHNICAL FIELD

The embodiments of the present invention relate to the field of computer technologies, and in particular, to a method for correcting a memory error of an application program.

BACKGROUND

When a memory error causes an exception to an application program, a processing solution in the prior art is: When a memory error is detected, error information is sent to a BIOS (Basic Input Output System, basic input output system), and the BIOS corrects a hardware in which an error occurs, or the BIOS sends the error information to a kernel (which may specifically be an operating system OS kernel), and the kernel corrects the hardware in which the error occurs. If the hardware correction fails, the OS kernel sends a kill signal to an application process where the exception occurs, so as to close the process.

In a process of implementing the present invention, the inventor finds that the prior art has at least the following problems.

With an existing solution for correcting a memory error, an unexpected restart of an application program is caused, thereby resulting in loss of key data and lowering reliability and security when the application program is used.

SUMMARY

The embodiments of the present invention is to provide a method for correcting a memory error of an application program, so as to avoid a problem that loss of key data is caused by an unexpected restart of the application program.

The embodiments of the present invention provide the following technical solutions.

A method for correcting a memory error of an application program includes:

when an error occurs in a memory occupied by the application program, suspending a process of the application program;

waking up an error correction program that corresponds to the application program, where the error correction program is created when the application program is started; and performing, by the error correction program, correction processing on the memory in which the error occurs; if the correction processing performed on the memory in which the error occurs fails, closing, by the error correction program, the application program, after saving key data of the application program; and if the correction processing performed on the memory in which the error occurs succeeds, restoring, by the error correction program, the process of the application program that is suspended.

It can be seen from the technical solution provided in the foregoing embodiment of the present invention that, when a memory error causes an exception to an application program, correction processing performed on the memory in which the error occurs is attempted through an error correction program created in advance and key data of the application program is saved when the correction processing performed on the memory in which the error occurs fails, thereby improving reliability and security when the application program is applied.

BRIEF DESCRIPTION OF THE DRAWINGS

To describe the technical solutions in the embodiments of the present invention more clearly, the accompanying drawings required for describing the embodiments are introduced briefly in the following. Apparently, the accompanying drawings in the following description are only some embodiments of the present invention, and persons of ordinary skill in the art may also derive other drawings from these accompanying drawings without creative efforts.

DETAILED DESCRIPTION

The technical solutions in the embodiments of the present invention are clearly and completely described in the following with reference to the accompanying drawings in the embodiments of the present invention. Apparently, the embodiments to be described are only a part rather than all of the embodiments of the present invention. Based on the embodiments of the present invention, all other embodiments obtained by persons of ordinary skill in the art without creative efforts shall fall within the protection scope of the present invention.

Figure 1:
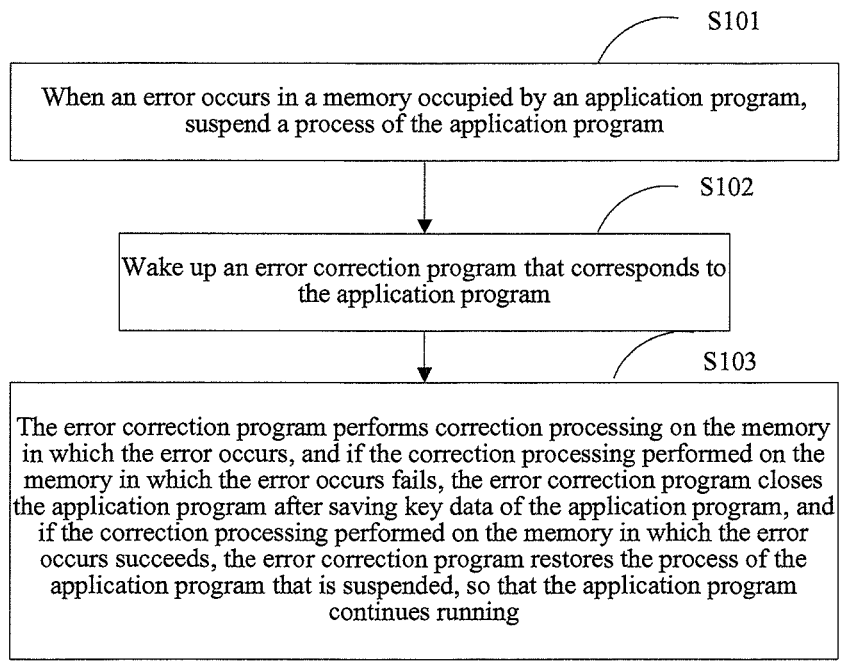
FIG. 1 is a flow chart of a method according to an embodiment of the present invention.

An embodiment of the present invention provides a method for correcting a memory error of an application program, and an implementation manner, as shown in FIG. 1, specifically includes the following operations.

S101: When an error occurs in a memory occupied by the application program, suspend a process of the application program.

It may be determined, according to an address of the memory in which the error occurs, to which application an exception occurs resulting from the memory error.

S102: Wake up an error correction program that corresponds to the application program, where the error correction program is created when the application program is started.

S103: The error correction program performs correction processing on the memory in which the error occurs, and if the correction processing performed on the memory in which the error occurs fails, the error correction program closes the application program after saving key data of the application program, and if the correction processing performed on the memory in which the error occurs succeeds, the error correction program restores the process of the application program that is suspended, so that the application program continues running.

With the method provided in this embodiment of the present invention, when a memory error causes an exception to an application program, correction processing performed on the memory in which the error occurs is attempted through an error correction program created in advance and key data of the application program is saved when the correction processing performed on the memory in which the error occurs fails, thereby improving reliability and security when the application program is applied.

As described in the foregoing, the error correction program is created when the application program is started. Therefore, a specific implementation manner of creating the error correction program is as follows: when the application program is started, creating an error correction program that corresponds to the application program; associating an ID of the error correction program with an ID of the process of the application program, and saving them into an error processing module; and blocking the error correction program in a kernel state. In addition, in the foregoing S103, after the correction processing performed on the memory in which the error occurs succeeds, the error correction program is still blocked in the kernel state and waits to be invoked next time. The error processing module is located in a bottom layer module of a kernel. Associating the ID of the error correction program with the ID of the process of the application program and saving them indicates saving the ID of the error correction program, the ID of the process of the application program, and a corresponding relationship between the ID of the error correction program and the ID of the process of the application program. In this embodiment of the present invention, a corresponding error correction programs may be created for all started application programs, and a corresponding error correction program may also be created for an application program that requires protection as specified.

In the method provided in this embodiment of the present invention, a specific implementation manner of the foregoing S102 may be: when the error occurs in the memory occupied by the application program, obtaining an ID of a process of the application program; according to the ID process, searching the error processing module for an ID of an error correction program that corresponds to the application program; and according to the ID of the error correction program, waking up the error correction program. A specific implementation manner of the wakeup may be: waking up the error correction program by invoking a wakeup function that is provided by the kernel, may also be: waking up the error correction program in a soft interruption manner, and may also be: using another common wakeup manner in an operating system.

In the method provided in this embodiment of the present invention, a specific implementation manner that in the foregoing S103, the error correction program performs correction processing on the memory in which the error occurs may be: obtaining, by the error correction program, information indicating that the memory error occurs, where the information indicating that the memory error occurs is sent by the error processing module, and the information indicating that the memory error occurs may include, but is not limited to, an address of the memory in which the error occurs, context information indicating that the error occurs, and so on; and according to the information indicating that the memory error occurs, performing correction processing on the memory in which the error occurs, where a specific implementation manner of the correction may be, but is not limited to: according to the address of the memory in which the error occurs and a range of each address segment in an application program to which an exception occurs, locating erroneous service data, and performing error correction by reloading the service data; or after locating erroneous service data, attempting to reallocate a memory area for the erroneous service data, and migrating this part of service data to the reallocated memory area. The information indicating that the memory error occurs is saved in the error processing module in advance.

In the method provided in this embodiment of the present invention, the address of the memory in which the error occurs may also be determined first, and when a memory page that corresponds to the address of the memory in which the error occurs is a read-only page of the application program, error correction is performed by using an existing method for correcting the read-only page; if the correction processing performed on the read-only page succeeds, the error correction ends; if the correction processing performed on the read-only page fails, the foregoing S101 is performed to suspend the process of the application program; and when the memory page that corresponds to the address of the memory in which the error occurs is not a read-only page, the foregoing S101 is performed to suspend the process of the application program.

In the method provided in this embodiment of the present invention, the foregoing error correction program may be an error correction thread, and may also be an error correction process. If the foregoing error correction program is an error correction thread, a specific implementation manner of suspending the process of the application program is suspending a thread other than the error correction thread in the application program.

A specific implementation manner of this embodiment of the present invention during practical application is described in detail in the following.

One Application Embodiment

In this application embodiment, an application program is corrected by creating an error correction thread, and a processing procedure is as follows.

Figure 2:
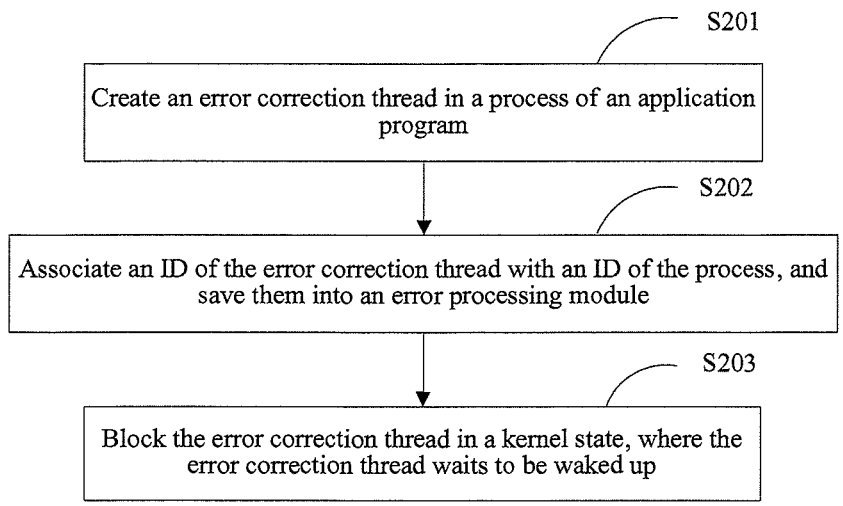
FIG. 2 is a flow chart of a method for creating an error correction thread according to an application embodiment of the present invention.

A start stage of an application program that requires protection, as shown in FIG. 2, includes the following operations.

S201: Create an error correction thread in a process of the application program.

S202: Associate an ID of the error correction thread with an ID of the process, and save them into an error processing module.

S203: Block the error correction thread in a kernel state, where the error correction thread waits to be woke up.

Figure 3A:
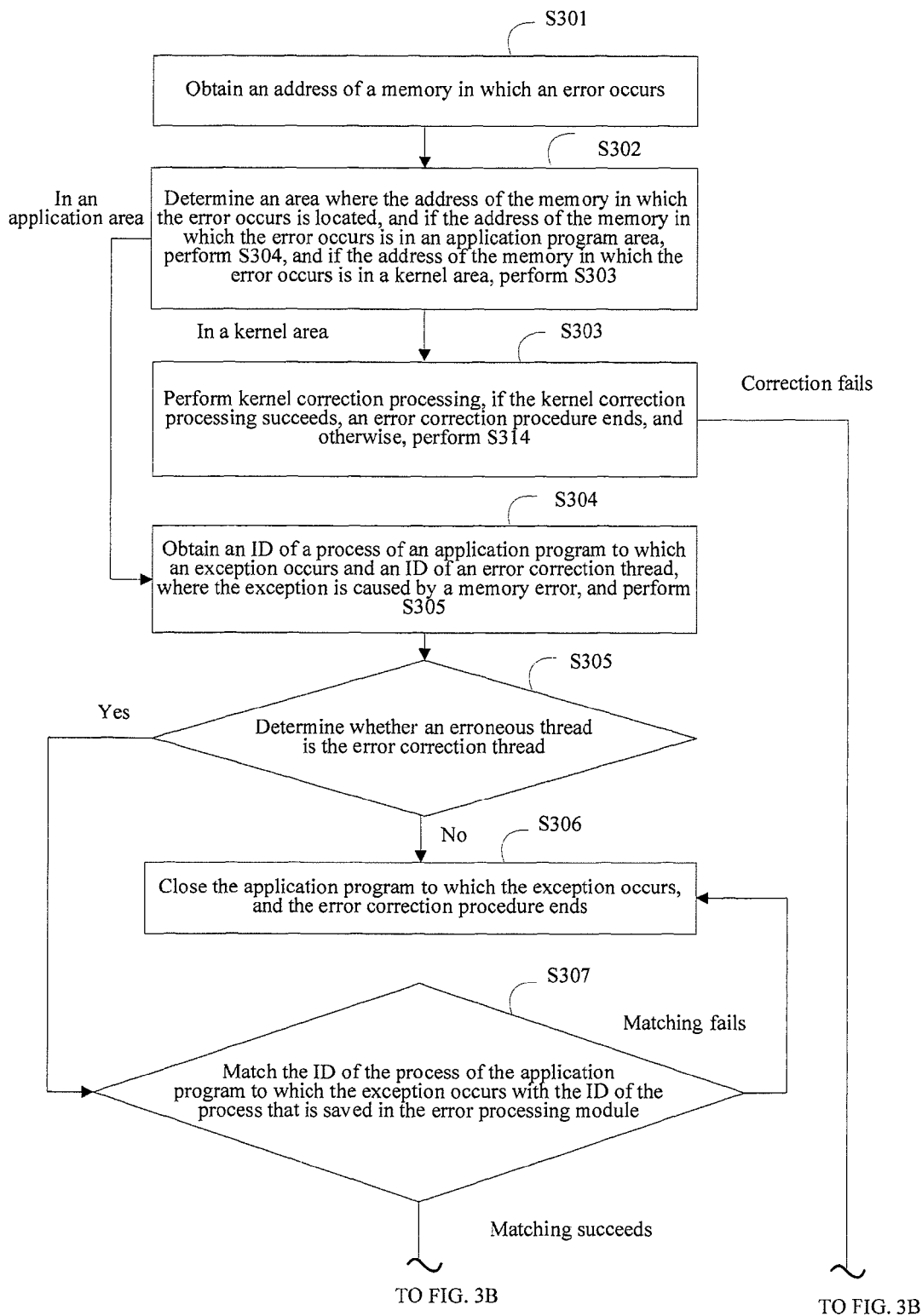
FIGS. 3A and 3B are a flow chart of a method for correcting an error according to an application embodiment of the present invention.
Figure 3B:
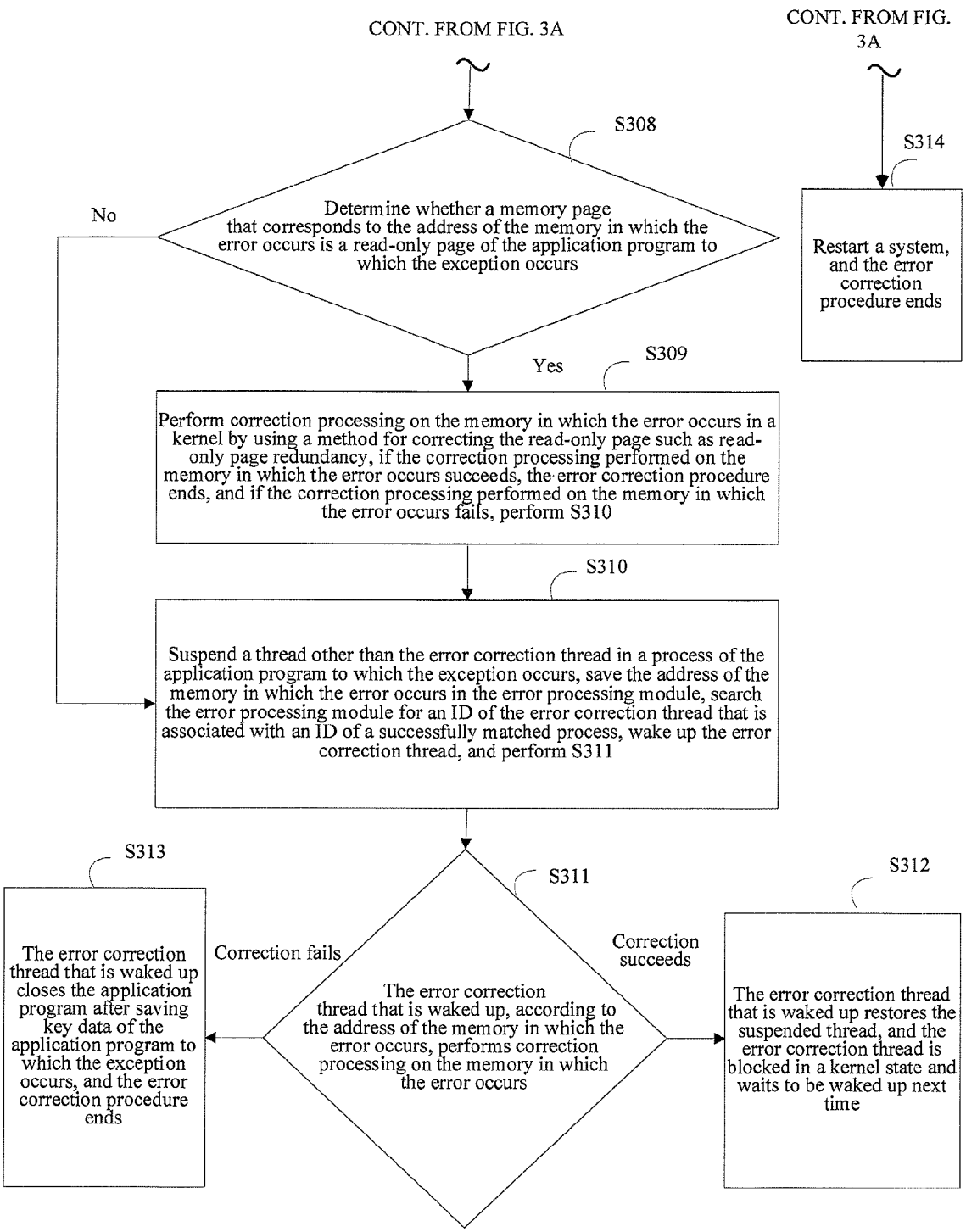

A stage where a memory error occurs, as shown in FIG. 3, includes the following operations.

S301: Obtain an address of a memory in which an error occurs.

S302: Determine an area where the address of the memory in which the error occurs is located, and if the address of the memory in which the error occurs is in an application program area, perform S304, and if the address of the memory in which the error occurs is in a kernel area, perform S303.

S303: Perform kernel correction processing, if the kernel correction processing succeeds, an error correction procedure ends, and otherwise, perform S314.

S304: Obtain an ID of a process of an application program to which an exception occurs and an ID of an error correction thread, where the exception is caused by a memory error, and perform S305.

S305: Determine whether an erroneous thread is the error correction thread, and if the erroneous thread is the error correction thread, perform S306, and otherwise, perform S307.

A specific implementation manner of determining whether the erroneous thread is an error correction thread may be: matching an ID of the erroneous thread with the ID of the error correction thread that is saved in the error processing module, if the ID of the error correction thread is the same as the ID of the erroneous thread, it indicates that the error correction thread is erroneous.

S306: Close the application program to which the exception occurs, and the error correction procedure ends.

S307: Match the ID of the process of the application program to which the exception occurs with the ID of the process that is saved in the error processing module, and if the matching succeeds, perform S308, and otherwise, perform S306.

S308: Determine whether a memory page that corresponds to the address of the memory in which the error occurs is a read-only page of the application program to which the exception occurs, and if the memory page that corresponds to the address of the memory in which the error occurs is a read-only page of the application program to which the exception occurs, perform S309, and otherwise, perform S310.

S309: Perform correction processing on the memory in which the error occurs in a kernel by using a method for correcting the read-only page such as read-only page redundancy, if the correction processing performed on the memory in which the error occurs succeeds, the error correction procedure ends, and if the correction processing performed on the memory in which the error occurs fails, perform S310.

S310: Suspend a thread other than the error correction thread in a process of the application program to which the exception occurs, save the address of the memory in which the error occurs in the error processing module, search the error processing module for an ID of the error correction thread that is associated with an ID of a successfully matched process, wake up the error correction thread, and perform S311.

The address memory in which the error occurs is associated with a corresponding ID of the process and a corresponding ID of a thread and saved, so that the address of the memory can be accurately found when the error correction thread performs error correction.

S311: The error correction thread that is woke up, according to the address of the memory in which the error occurs, performs correction processing on the memory in which the error occurs, if the correction processing performed on the memory in which the error occurs succeeds, perform S312, and otherwise, perform S313.

S312: The error correction thread that is woke up restores the suspended thread, and the error correction thread is blocked in a kernel state and waits to be woke up next time.

S313: The error correction thread that is woke up closes the application program after saving key data of the application program to which the exception occurs, and the error correction procedure ends.

S314: Restart a system, and the error correction procedure ends.

In the method provided in the foregoing application embodiment, when the memory error causes an exception to the application program, the application program to which the exception occurs can participate in error correction, so that key data of the application program can be saved in time when the error correction fails, thereby preventing the application program from an unexpected crash caused by a hardware error and improving security and stability when the application program is used. In addition, in an existing error correction procedure, a signal command is sent to a process of the application program to indicate that the application program is closed. However, a process of one application program may include multiple threads, and it cannot be determined which thread is to process a received signal, which may result in diffusion of erroneous data. In this application embodiment, a thread other than the error correction thread is suspended, thereby preventing this problem.

Another Application Embodiment

In this application embodiment, an application program is corrected by creating an error correction process, and a processing procedure is as follows.

Figure 4:
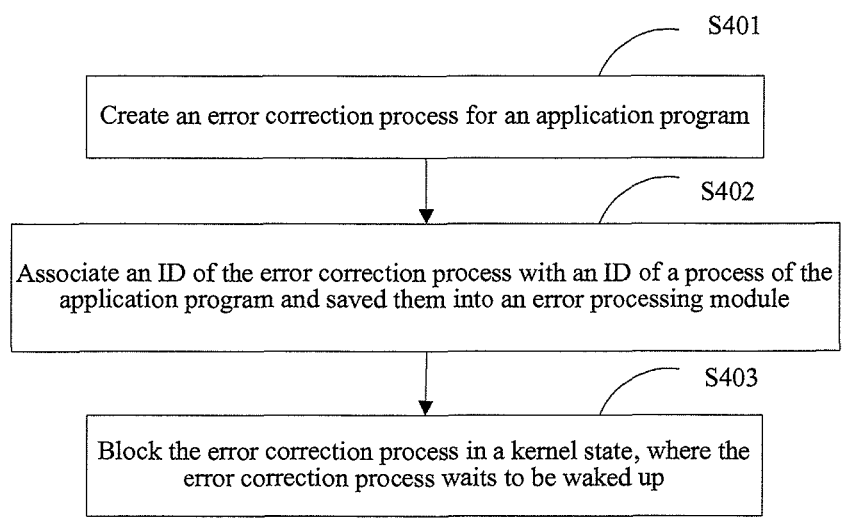
FIG. 4 is a flow chart of a method for creating an error correction process according to another application embodiment of the present invention.
Figure 5A:
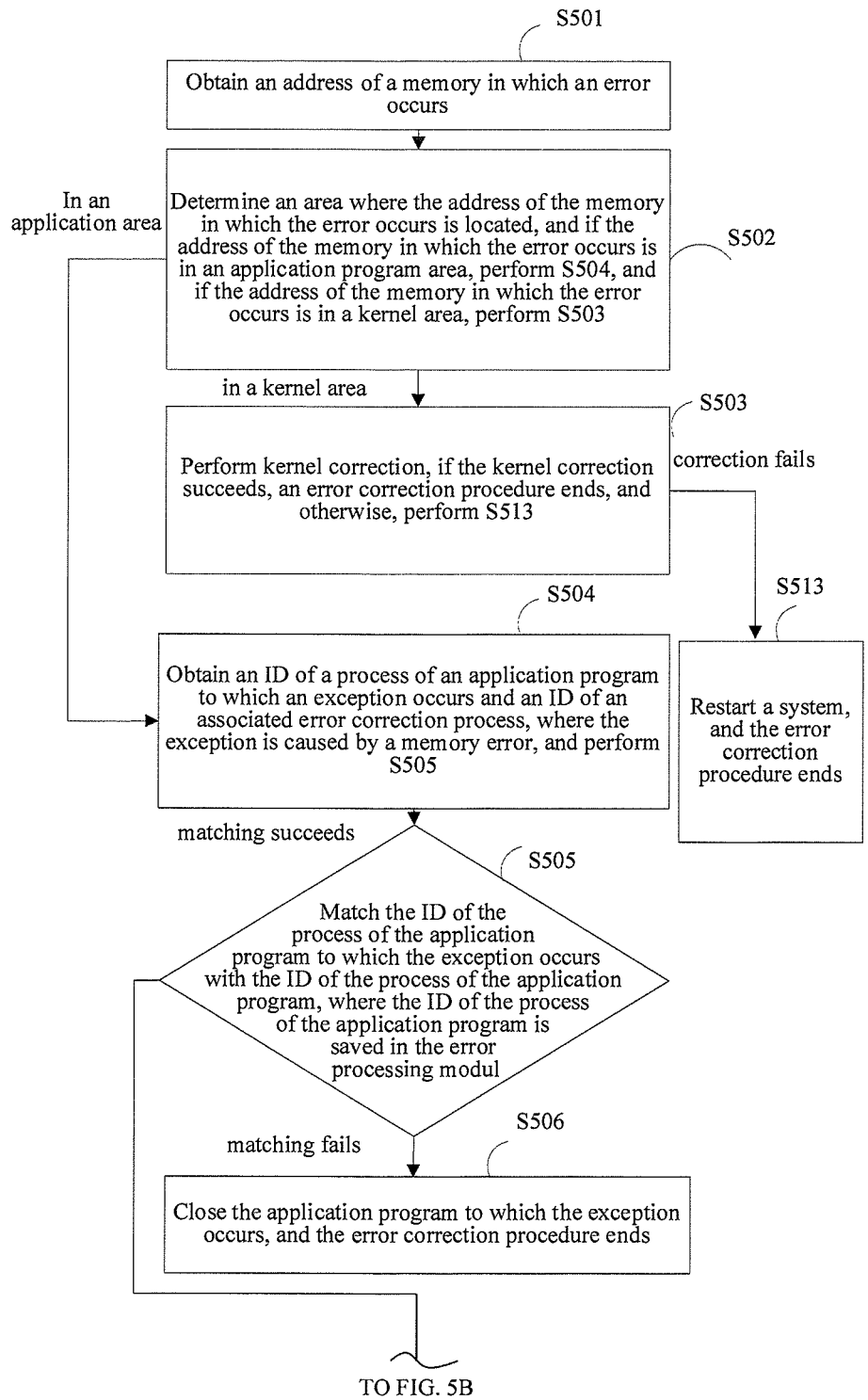
FIGS. 5A and 5B are a flow chart of a method for correcting an error according to another application embodiment of the present invention.
Figure 5B:
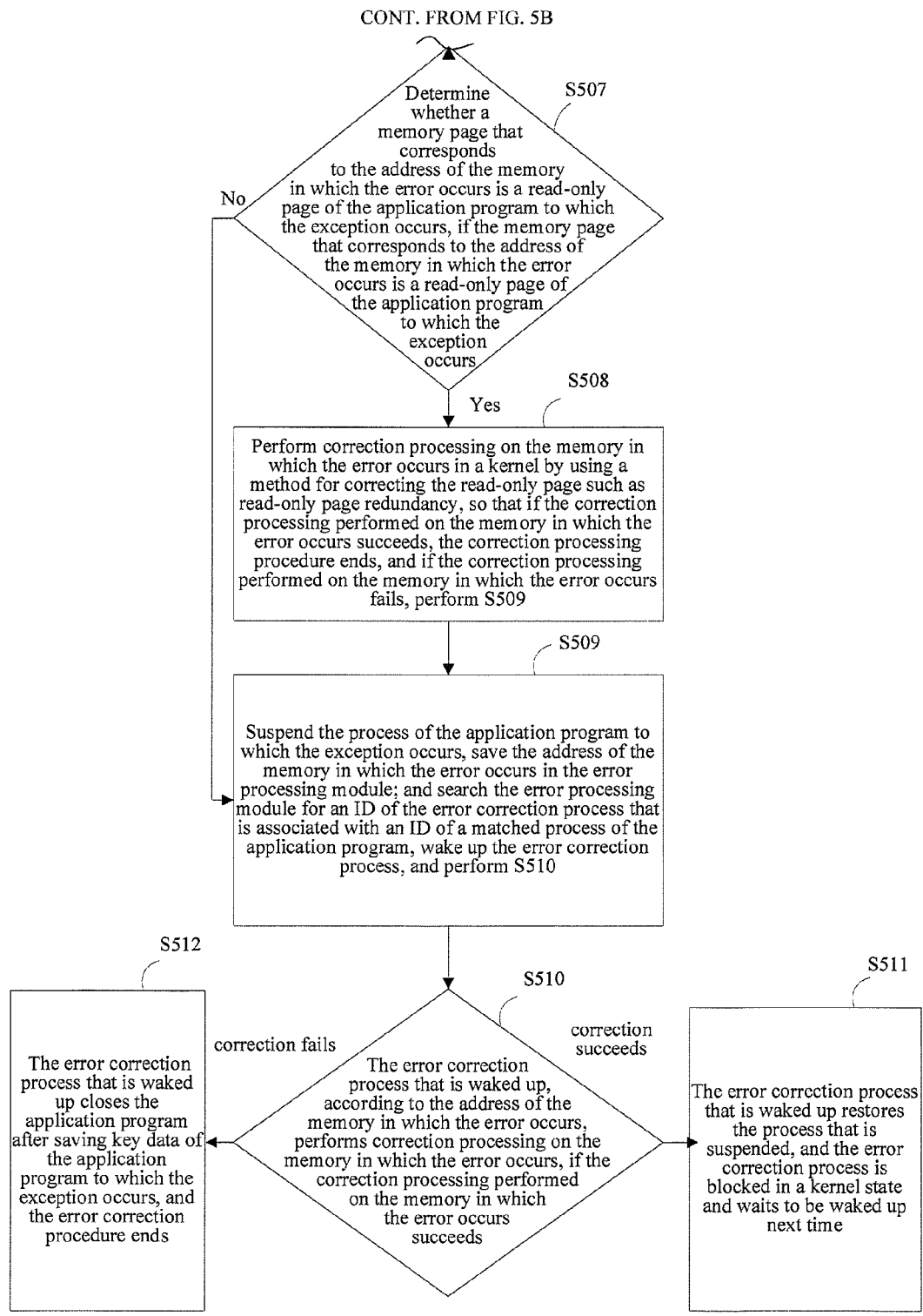

A start stage of an application program that requires protection, as shown in FIG. 4, includes the following operations.

S401: Create an error correction process for the application program.

S402: Associate an ID of the error correction process with an ID of a process of the application program and saved them into an error processing module.

S403: Block the error correction process in a kernel state, where the error correction process waits to be woke up.

A stage where a memory error occurs, as shown in FIG. 3, includes the following operations.

S501: Obtain an address of a memory in which an error occurs.

S502: Determine an area where the address of the memory in which the error occurs is located, and if the address of the memory in which the error occurs is in an application program area, perform S504, and if the address of the memory in which the error occurs is in a kernel area, perform S503.

S503: Perform kernel correction, if the kernel correction succeeds, an error correction procedure ends, and otherwise, perform S513.

S504: Obtain an ID of a process of an application program to which an exception occurs and an ID of an associated error correction process, where the exception is caused by a memory error, and perform S505.

S505: Match the ID of the process of the application program to which the exception occurs with the ID of the process of the application program, where the ID of the process of the application program is saved in the error processing module, and if the matching succeeds, perform S507, and otherwise, perform S506.

S506: Close the application program to which the exception occurs, and the error correction procedure ends.

S507: Determine whether a memory page that corresponds to the address of the memory in which the error occurs is a read-only page of the application program to which the exception occurs, if the memory page that corresponds to the address of the memory in which the error occurs is a read-only page of the application program to which the exception occurs, perform S508, and otherwise, perform S509.

S508: Perform correction processing on the memory in which the error occurs in a kernel by using a method for correcting the read-only page such as read-only page redundancy, so that if the correction processing performed on the memory in which the error occurs succeeds, the correction processing procedure ends, and if the correction processing performed on the memory in which the error occurs fails, perform S509.

S509: Suspend the process of the application program to which the exception occurs, save the address of the memory in which the error occurs in the error processing module; and search the error processing module for an ID of the error correction process that is associated with an ID of a matched process of the application program, wake up the error correction process, and perform S510.

S510: The error correction process that is woke up, according to the address of the memory in which the error occurs, performs correction processing on the memory in which the error occurs, if the correction processing performed on the memory in which the error occurs succeeds, perform S511, and otherwise, perform S512.

S511: The error correction process that is woke up restores the process that is suspended, and the error correction process is blocked in a kernel state and waits to be woke up next time.

S512: The error correction process that is woke up closes the application program after saving key data of the application program to which the exception occurs, and the error correction procedure ends.

S513: Restart a system, and the error correction procedure ends.

In the method provided in the foregoing application embodiment, when the memory error causes an exception to the application program, a created error correction process associated with the application program to which the exception occurs participates in error correction, so that key data of the application program can be saved in time when the error correction fails, thereby preventing the application program from an unexpected crash caused by a hardware error and improving security and stability when the application program is used. In addition, in an existing error correction procedure, a signal command is sent to a process of the application program to indicate that the application program is closed. However, a process of one application program may include multiple threads, and it cannot be determined which thread is to process a received signal, which may result in diffusion of erroneous data. In this application embodiment, a process of the application program to which the exception occurs is suspended, so that it does not need to send a signal to this process, thereby preventing this problem.

All or a part of the steps of the method in the foregoing method embodiments may be implemented by a program instructing relevant hardware. The program may be stored in a computer readable storage medium. When the program runs, the steps of the foregoing method embodiments are performed. The storage medium may be any medium that is capable of storing program codes, such as a ROM, a RAM, a magnetic disk, or an optical disk.

The foregoing descriptions are merely exemplary specific embodiments of the present invention, but are not intended to limit the protection scope of the present invention. Any modification or replacement easily thought of by persons skilled in the art without departing from the technical scope of the present invention shall all fall within the protection scope of the present invention. Therefore, the protection scope of the present invention should be subject to the protection scope of the claims.

What is claimed is:

1. A method for correcting a memory error of an application program, the method comprising:

when an error occurs in a memory occupied by the application program, suspending a process of the application program;

waking up an error correction program that corresponds to the application program, wherein the error correction program is created when the application program is started, wherein the error correction program is woke up in a soft interruption manner; and performing, by the error correction program, correction processing on the memory in which the error occurs to correct the error in the memory; if the correction processing performed on the memory in which the error occurs fails, closing, by the error correction program, the application program, after saving key data of the application program; and if the correction processing performed on the memory in which the error occurs succeeds, restoring, by the error correction program, the process of the application program that is suspended.

2. The method according to claim 1, wherein the method further comprises:

when the application program is started, creating the error correction program;

associating an ID of the error correction program with an ID of the process and saving them into an error processing module; and blocking the error correction program in a kernel state.

3. The method according to claim 2, wherein waking up the error correction program that corresponds to the application program comprises:

when the error occurs in the memory occupied by the application program, obtaining the ID of the process of the application program;

according to the ID of the process, searching the error processing module for the ID of the error correction program that corresponds to the application program; and according to the ID of the error correction program, waking up the error correction program.

4. The method according to claim 2, wherein, performing, by the error correction program, correction processing on the memory in which the error occurs and that is occupied by the application program comprises:

obtaining, by the error correction program, information for indicating that the memory error occurs, wherein the information for indicating that the memory error occurs is sent by the error processing module;

and performing, according to the information for indicating that the memory error occurs, correction processing on the memory in which the error occurs, wherein the information for indicating that the memory error occurs comprises an address of the memory in which the error occurs.

5. The method according to claim 3, wherein, performing, by the error correction program, correction processing on the memory in which the error occurs and that is occupied by the application program comprises:

obtaining, by the error correction program, information for indicating that the memory error occurs, wherein the information for indicating that the memory error occurs is sent by the error processing module;

and performing, according to the information for indicating that the memory error occurs, correction processing on the memory in which the error occurs, wherein the information for indicating that the memory error occurs comprises an address of the memory in which the error occurs.

6. The method according to claim 4, wherein suspending the process of the application program further comprises:
   determining the address of the memory in which the error occurs, when a memory page that corresponds to the address of the memory in which the error occurs is a read-only page of the application program, performing correction processing on the read-only page by using a method for correcting the read-only page, and if the correction processing performed on the read-only page fails, suspending the process of the application program; and
   when the memory page that corresponds to the address of the memory in which the error occurs is not a read-only page of the application program, suspending the process of the application program.

7. The method according to claim 5, wherein suspending the process of the application program further comprises:
   determining the address of the memory in which the error occurs, when a memory page that corresponds to the address of the memory in which the error occurs is a read-only page of the application program, performing correction processing on the read-only page by using a method for correcting the read-only page, and if the correction processing performed on the read-only page fails, suspending the process of the application program; and
   when the memory page that corresponds to the address of the memory in which the error occurs is not a read-only page of the application program, suspending the process of the application program.

8. The method according to claim 1, wherein, if the error correction program is an error correction thread in the process of the application program, suspending the process of the application program comprises:
   suspending a thread other than the error correction thread in the application program.

9. The method according to claim 1, wherein the error correction program is an error correction process.

10. The method according to claim 1, wherein, after the correction processing performed by the error correction program on the memory in which the error occurs succeeds, the method further comprises:
   blocking the error correction thread in a kernel state.

11. A non-transitory computer-readable medium having computer executable instructions for performing a method comprising:
   when an error occurs in a memory occupied by an application program, suspending a process of the application program;
   waking up an error correction program that corresponds to the application program, wherein the error correction program is created when the application program is started, wherein the error correction program is woke up in a soft interruption manner; and
   performing, by the error correction program, correction processing on the memory in which the error occurs to correct the error in the memory; if the correction processing performed on the memory in which the error occurs fails, closing, by the error correction program, the application program, after saving key data of the application program; and if the correction processing performed on the memory in which the error occurs succeeds, restoring, by the error correction program, the process of the application program that is suspended.

12. The computer-readable medium according to claim 11, wherein the instructions are further for:
   when the application program is started, creating the error correction program;
   associating an ID of the error correction program with an ID of the process and saving them into an error processing module; and
   blocking the error correction program in a kernel state.

13. The computer-readable medium according to claim 12, wherein in the waking up the error correction program that corresponds to the application program, the instructions are for:
   when the error occurs in the memory occupied by the application program, obtaining the ID of the process of the application program;
   according to the ID of the process, searching the error processing module for the ID of the error correction program that corresponds to the application program; and
   according to the ID of the error correction program, waking up the error correction program.

14. The computer-readable medium according to claim 12, wherein, in the performing, by the error correction program, correction processing on the memory in which the error occurs and that is occupied by the application program, the instructions are for:
   obtaining, by the error correction program, information for indicating that the memory error occurs, wherein the information for indicating that the memory error occurs is sent by the error processing module;
   and performing, according to the information for indicating that the memory error occurs, correction processing on the memory in which the error occurs, wherein the information for indicating that the memory error occurs comprises an address of the memory in which the error occurs.

15. The computer-readable medium according to claim 13, wherein, in the performing, by the error correction program, correction processing on the memory in which the error occurs and that is occupied by the application program, the instructions are for:
   obtaining, by the error correction program, information for indicating that the memory error occurs, wherein the information for indicating that the memory error occurs is sent by the error processing module;
   and performing, according to the information for indicating that the memory error occurs, correction processing on the memory in which the error occurs, wherein the information for indicating that the memory error occurs comprises an address of the memory in which the error occurs.

16. The computer-readable medium according to claim 14, wherein in the suspending the process of the application program further, the instructions are for:
   determining the address of the memory in which the error occurs, when a memory page that corresponds to the address of the memory in which the error occurs is a read-only page of the application program, performing correction processing on the read-only page by using a method for correcting the read-only page, and if the correction processing performed on the read-only page fails, suspending the process of the application program; and
   when the memory page that corresponds to the address of the memory in which the error occurs is not a read-only page of the application program, suspending the process of the application program.

17. The computer-readable medium according to claim 15, wherein in the suspending the process of the application program further, the instructions are for:
- determining the address of the memory in which the error occurs, when a memory page that corresponds to the address of the memory in which the error occurs is a read-only page of the application program, performing correction processing on the read-only page by using a method for correcting the read-only page, and if the correction processing performed on the read-only page fails, suspending the process of the application program; and
- when the memory page that corresponds to the address of the memory in which the error occurs is not a read-only page of the application program, suspending the process of the application program.

18. The computer-readable medium according to claim 11, wherein the instructions are further for:
- blocking the error correction thread in a kernel state.

* * * * *